United States Patent
Shumaker et al.

(10) Patent No.: US 9,510,516 B2
(45) Date of Patent: Dec. 6, 2016

(54) LANDSCAPING BLOWER NOZZLE ASSEMBLY

(71) Applicant: Porta Maker, Inc., Grand Rapids, MI (US)

(72) Inventors: Kristopher D. Shumaker, Grand Rapids, MI (US); Jeremy C. Stoddard, Holland, MI (US); Steven J. Leibrandt, Muskegon, MI (US)

(73) Assignee: Porta Maker, Inc., Grand Rapids, MI (US)

( * ) Notice: Subject to any disclaimer, the term of this patent is extended or adjusted under 35 U.S.C. 154(b) by 0 days.

(21) Appl. No.: 14/920,461

(22) Filed: Oct. 22, 2015

(65) Prior Publication Data

US 2016/0113207 A1    Apr. 28, 2016

Related U.S. Application Data

(60) Provisional application No. 62/067,138, filed on Oct. 22, 2014.

(51) Int. Cl.
| | |
|---|---|
| *A01G 1/12* | (2006.01) |
| *B08B 5/02* | (2006.01) |
| *A47L 9/08* | (2006.01) |
| *E01H 1/08* | (2006.01) |
| *A01D 41/06* | (2006.01) |

(52) U.S. Cl.
CPC .............. *A01G 1/125* (2013.01); *A47L 9/08* (2013.01); *B08B 5/02* (2013.01); *E01H 1/0809* (2013.01); *A01D 41/06* (2013.01)

(58) Field of Classification Search
CPC ............. A01G 1/125; B08B 5/00; B08B 5/02; A47L 5/14; A47L 9/08; A47L 9/242; A47L 9/248; A47L 9/2847; E01H 1/0809; E01H 1/08; A01D 41/06

USPC ................................................ 15/327.5, 405
IPC ........................................................ A01G 1/12
See application file for complete search history.

(56) References Cited

U.S. PATENT DOCUMENTS

| | | | |
|---|---|---|---|
| 1,981,099 A | 11/1934 | Fender | |
| 2,561,882 A | 7/1951 | Patton | |
| 3,808,632 A | 5/1974 | Aagesen | |
| 4,023,286 A | 5/1977 | Wickware et al. | |
| 4,549,365 A | 10/1985 | Johnson | |
| 5,479,730 A | 1/1996 | Gogan | |
| 6,073,305 A | 6/2000 | Hesskamp | |
| 6,178,668 B1 | 1/2001 | Gustafson et al. | |
| 6,226,833 B1 * | 5/2001 | Kawaguchi | A01G 1/125 15/330 |
| 6,735,814 B2 | 5/2004 | Franklin et al. | |
| 7,240,891 B2 | 7/2007 | Hafendorfer | |
| 7,712,232 B2 | 5/2010 | Majkrzak | |
| 8,220,849 B2 | 7/2012 | Beaird, III et al. | |
| 8,387,205 B2 | 3/2013 | Weihl et al. | |
| 8,579,058 B1 | 11/2013 | Yamada et al. | |
| 2015/0237808 A1 * | 8/2015 | Prager | A47L 5/14 15/405 |

* cited by examiner

*Primary Examiner* — David Redding
(74) *Attorney, Agent, or Firm* — Frank M. Scutch, III

(57) ABSTRACT

A landscaping blower nozzle assembly includes an inlet section for allowing air into the assembly, an elbow section and a motor. A nozzle is insertable into the elbow section such that the motor moves the elbow section in an moveable motion back and forth though at least 180 degree of motion for aiding the operator in the movement and removal of leaves and other debris.

20 Claims, 8 Drawing Sheets

LANDSCAPING BLOWER NOZZLE ASSEMBLY

CROSS REFERENCE TO RELATED APPLICATIONS

This application claims priority under 35 U.S.C. §119(e) to U.S. Provisional Application Ser. No. 62/067,138 entitled "A Vehicular Landscaping Blower Assembly and Method of Forming Same" filed on Oct. 22, 2014 and assigned to Porta Maker, Inc.

FIELD OF THE INVENTION

The invention relates to the field of lawn and ground maintenance and more particularly to a moveable nozzle used with a leaf and debris blower assembly.

BACKGROUND OF THE INVENTION

Leaf and debris blowers are well known in the art and work as powered tools that propel air out of a nozzle. These tools are typically used to move yard debris such as leaves or lawn debris. Leaf blowers are most often powered by either electric or gasoline motors. Moreover, leaf blowers are typically self-contained handheld units, or backpack mounted units that use a handheld wand. The latter is more ergonomic for prolonged use. Larger units may rest on wheels and even use a motor for propulsion. These are sometimes called "walk behind leaf blowers" because they must be pushed by hand to be operated. Some units can also be towed behind a vehicle and may be difficult to operate due to their distance from the operator.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 1A is a side view of the moveable nozzle showing a tensioning cable.

Figure 1:
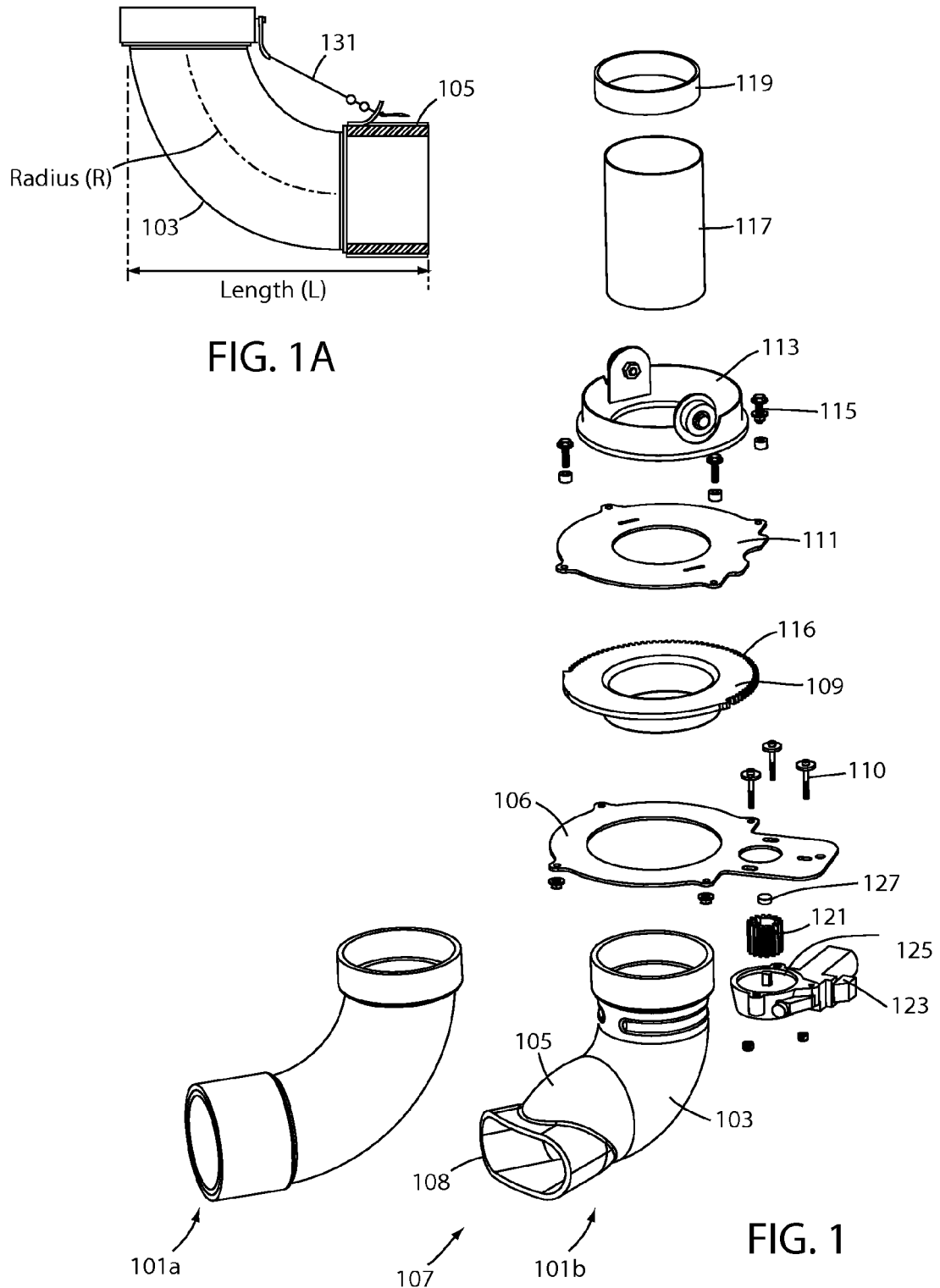
FIG. 1 is an exploded view illustrating the components of the moveable nozzle assembly shown in FIG. 1.
Figure 2:
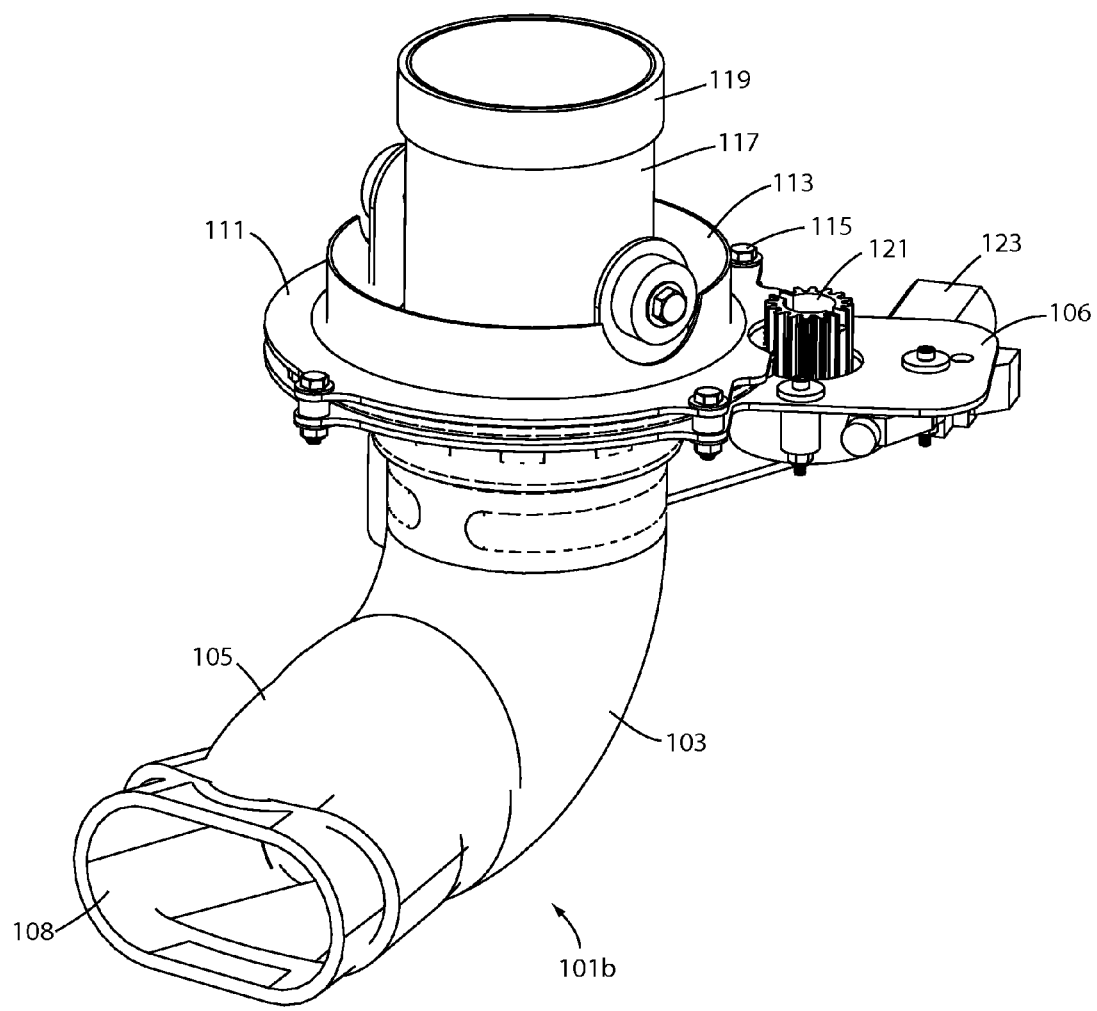
FIG. 2 is a side perspective view of moveable nozzle assembly according to an embodiment of the invention.
Figure 3:
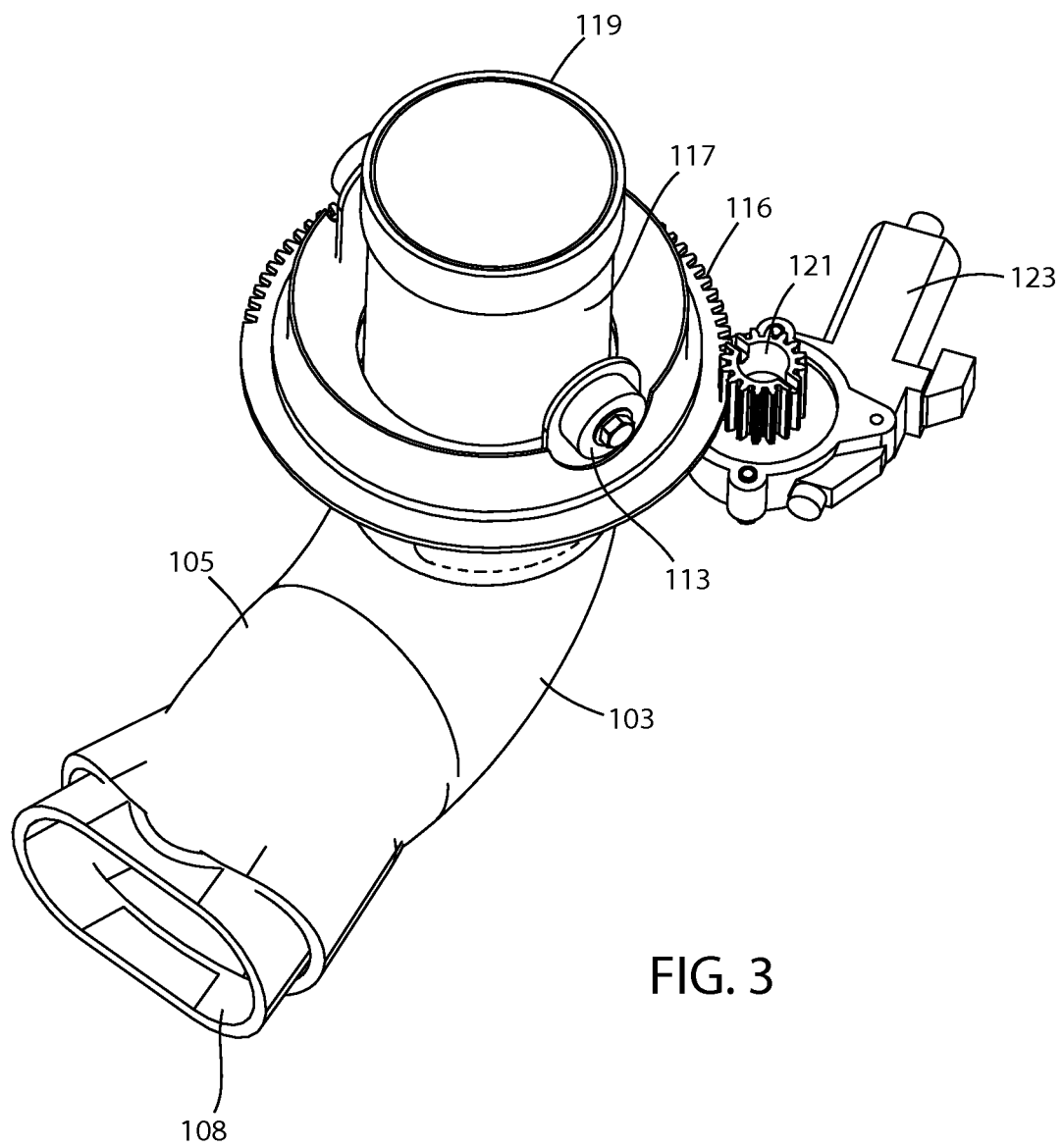
FIG. 3 is a top perspective view of the moveable nozzle assembly.
Figure 4:
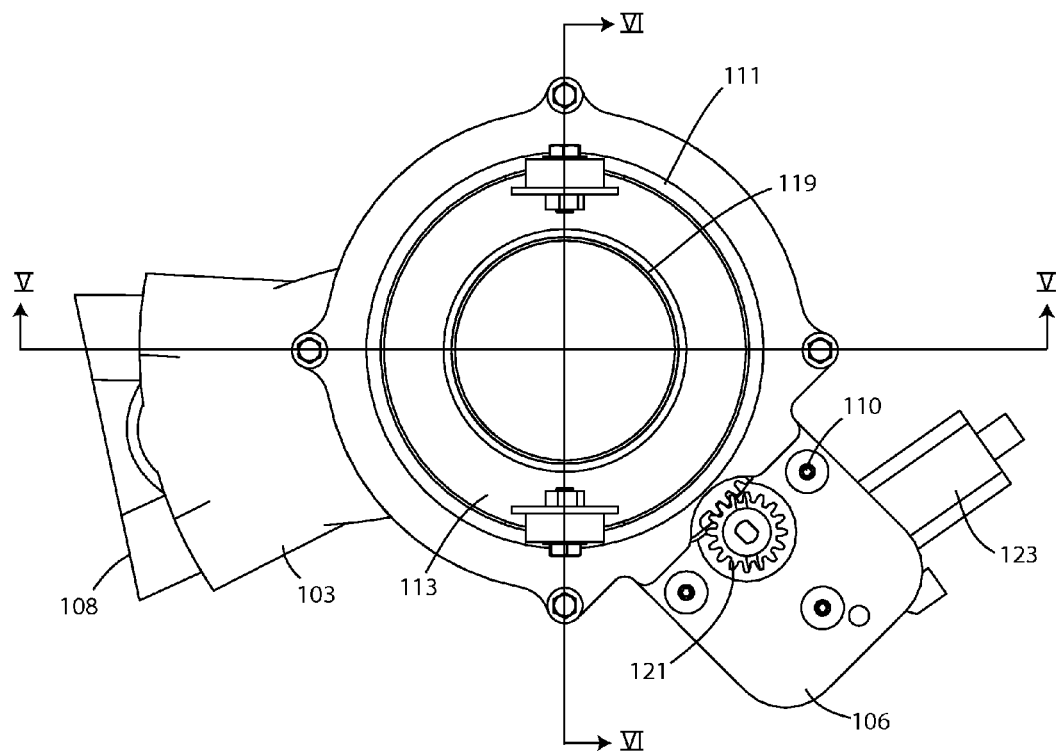
FIG. 4 is top view of the moveable nozzle assembly.
Figure 5:
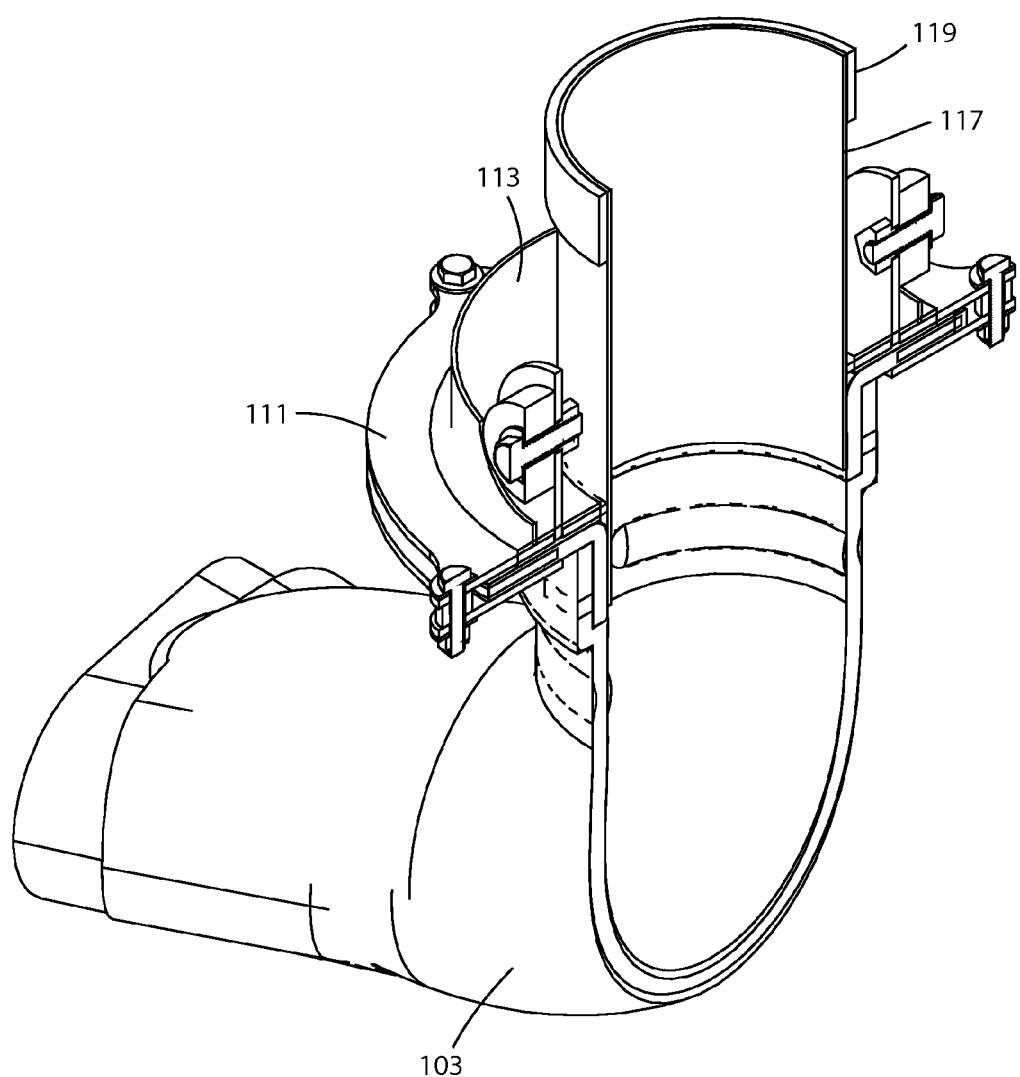
FIG. 5 is cross-sectional view shown through lines V-V of FIG. 4.
Figure 6:
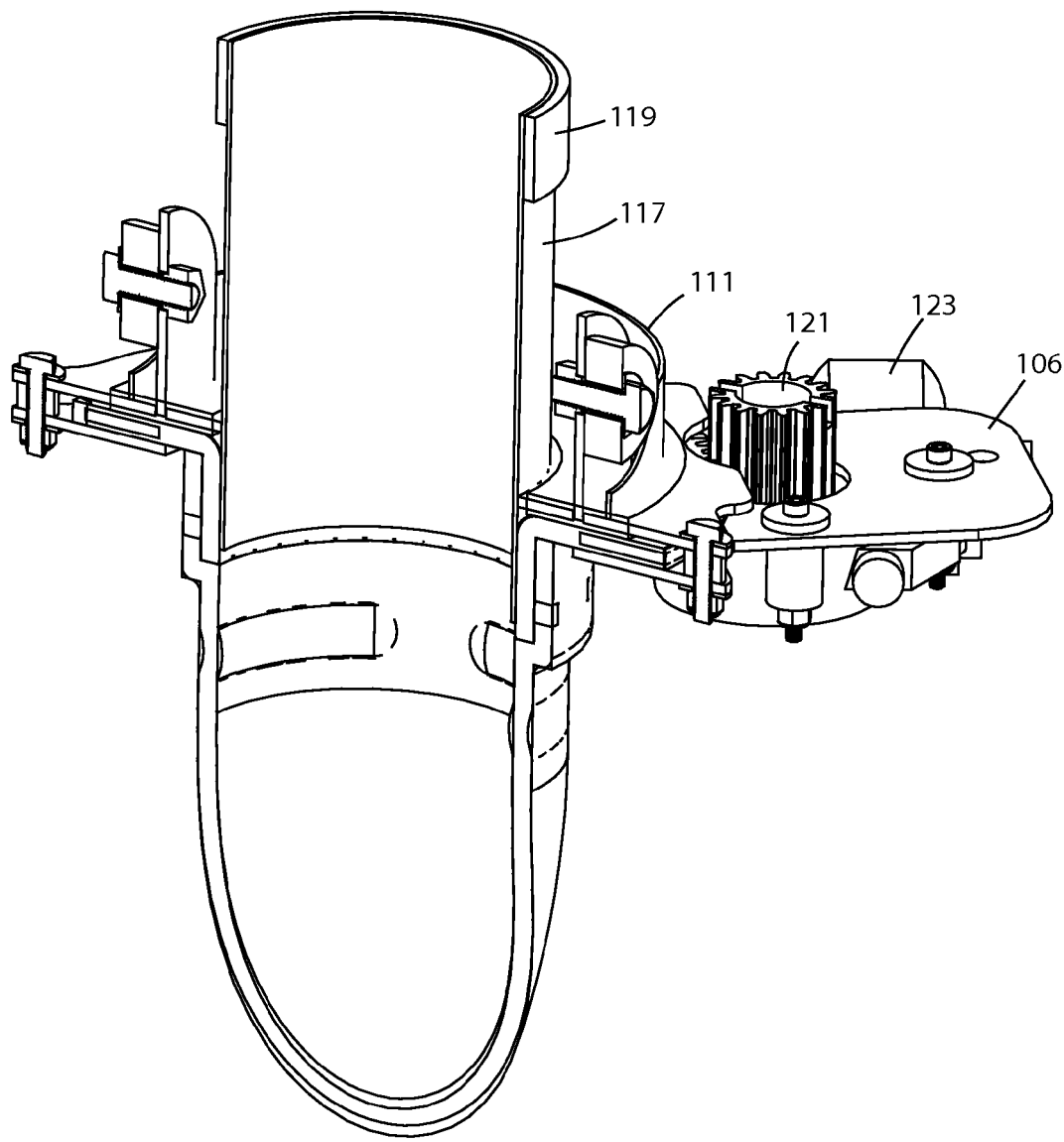
FIG. 6 is cross-sectional view shown through lines VI-VI of FIG. 4.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to a moveable nozzle assembly. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

FIG. 1 to FIG. 6 illustrate various views of the moveable nozzle assembly that can be used with ground maintenance machines such as a blower assembly. With regard to FIG. 1 to FIG. 6, the moveable nozzle assembly 100 includes a flexible elbow 103, having air exhaust nozzle 107 attached to the distal end thereof. The elbow 103 gradually bends through approximately 90 degrees and is manufactured of a moldable, pliable rubber or vinyl material so to allow the elbow 103 to easily flex, move and/or bend while in use. This might occur while the blower assembly is in motion and the elbow was to come into contact with either the ground or objects on the ground coming into contact with the exhaust nozzle 107. The flexibility of the elbow 103 allows, at least the distal portion, to retain its shape so to snap back into a fixed position after any forces from bending are removed.

As seen in FIG. 1, the exhaust nozzle 107 is shown in two embodiments namely outlet 101*a* and outlet 101*b*. The outlet 101*a* has a round exhaust end while the alternative outlet 101*b* has a narrow exhaust end. Those skilled in the art will recognize differing types or shapes are exhaust nozzles are possible. The elbow 103 may be slightly enlarged at its lower portion 105 to provide a cavity for a hardened insert 108. The hardened insert 108 is used to maintain its rigidity and shape as air, moving at a high velocity, exits the nozzle tip. Hence, the nozzle 107 can also be used in combination with the removable insert depending on application. Those skilled in the art will also recognize that the insert 108 has a predetermined narrowed shape and is made of a rigid material used for preventing the nozzle 107 from changing overall configuration and shape during use. Preferably, the overall shape of the nozzle 107 and insert 108 should remain constant during use, regardless of the airflow forces, so as the highest degree of linear air flow can be achieved through the nozzle.

Further, the proximal end of elbow 103 is used with an elbow plate 106. The elbow plate 106 is generally circular in shape and includes apertures around its perimeter for use with screws and/or other fasteners 110. The fasteners 110 hold the elbow plate 106 to a supporting surface. The elbow plate 106 works to join and/or seal an upper tube 117 and seal 119 to a corresponding joining section of the elbow ring gear 116. The ring gear 116 can be formed either as a one or two piece assembly and includes a top toothed gear and a bottom attachment sleeve 109 that fits within the elbow plate 106. In use, the upper tube 117 is a sealed tube that channels the exhaust air exiting directly from an associated blower motor and/or propeller assembly (not shown). Included between the elbow plate 106 and elbow 103 is a gear 116. The gear 116 is generally flat in shape and includes teeth along its outer circumference that mesh with a pinion 121. The gear 116 includes stops at both ends of the gear teeth for permitting the gear 116 to move only in a predetermined angular range. For example, the gear 116 may be set to move in an arcuate range of 0 to 200 degrees relative to a point forward of the blower. Further, the pinion 121 is a cylindrical gear that is vertically mounted within channel 125 and mechanically connected to rotation motor 123. The channel 125 is integrally formed within the elbow plate 106. The rotation motor 123 is typically a small 12 volt DC motor that operates to precisely rotate the pinion 121 in either direction from a center position. As seen in FIG. 1, pinion 121 is positioned on top of the motor 123 within a round channel 125 to keep it into a fixed position.

In use, the motor 123 rotates the pinion 121, which in-turn controls movement of the gear 116 as the teeth of the pinion 121 and the teeth of gear 116 are mechanically meshed together in juxtaposition. Since the gear 116 is attached to the elbow 103, the movement of the gear 115 causes the nozzle 107 to move in a horizontal motion or arc, in relation to the ground. The range of motion is at least 180 degrees or more but less than 360 degrees. Thus, when the blower assembly 100 is placed on a vehicle, this allows great versatility where the exhaust airflow can be easily changed depending on conditions of the blower or user requirements. This movement can optionally be set up to provide movement in a predetermined arc of motion while exhaust air blows across the ground. Further, in order to show position of the exhaust nozzle 107, FIG. 1 illustrates a potentiometer 127 that is attached to the top of pinion 121. In use, the pinion 121 rotates a wiper in the potentiometer 127 to some resistance value. This resistance value is then measured using an electric comparator or like device. This value is then correlated to a position of the exhaust nozzle relative to the ground or the vehicle body. The position of the exhaust nozzle 107 can then be communicated to a display device for visual use by the operator.

As seen in FIG. 1A, a tensioning cable 131 is connected to the tip of the top portion of the elbow 103 for preventing the elbow 103 from extending and/or straightening downwardly toward the ground. Since any downward extension would impede and/or alter the intended direction of airflow, the tensioner prevents such movement. In use, the tensioning cable can be manually adjusted or controlled by an actuator, lanyard or cable to allow the nozzle 107 to reciprocate upwardly or downwardly relative to the ground. Hence As seen in FIG. 1A, there are at least four components to the air exhaust nozzle 107 that make it unique to a landscaping blower assembly namely; 1) the radius of the elbow 103; 2) the length of the elbow's straight lower portion 105; 3) the hardness and elastic modulus of the elbow material; and 4) the use of tensioning cable 131. All of these features working in combination to allow the exhaust nozzle 107 to perform in a novel and unique way as compared to the prior art. Those skilled in the art will also recognize that the radius of the elbow 103 is specially selected with a gradual bend for allowing the airflow to bend at approximately 90 degrees with minimal turbulence. This gradual bend allows the force of the air from the blower to be maintained at a substantially high level without a reduction in forces that would occur from a tight or abrupt bend in the nozzle.

Figure 7:
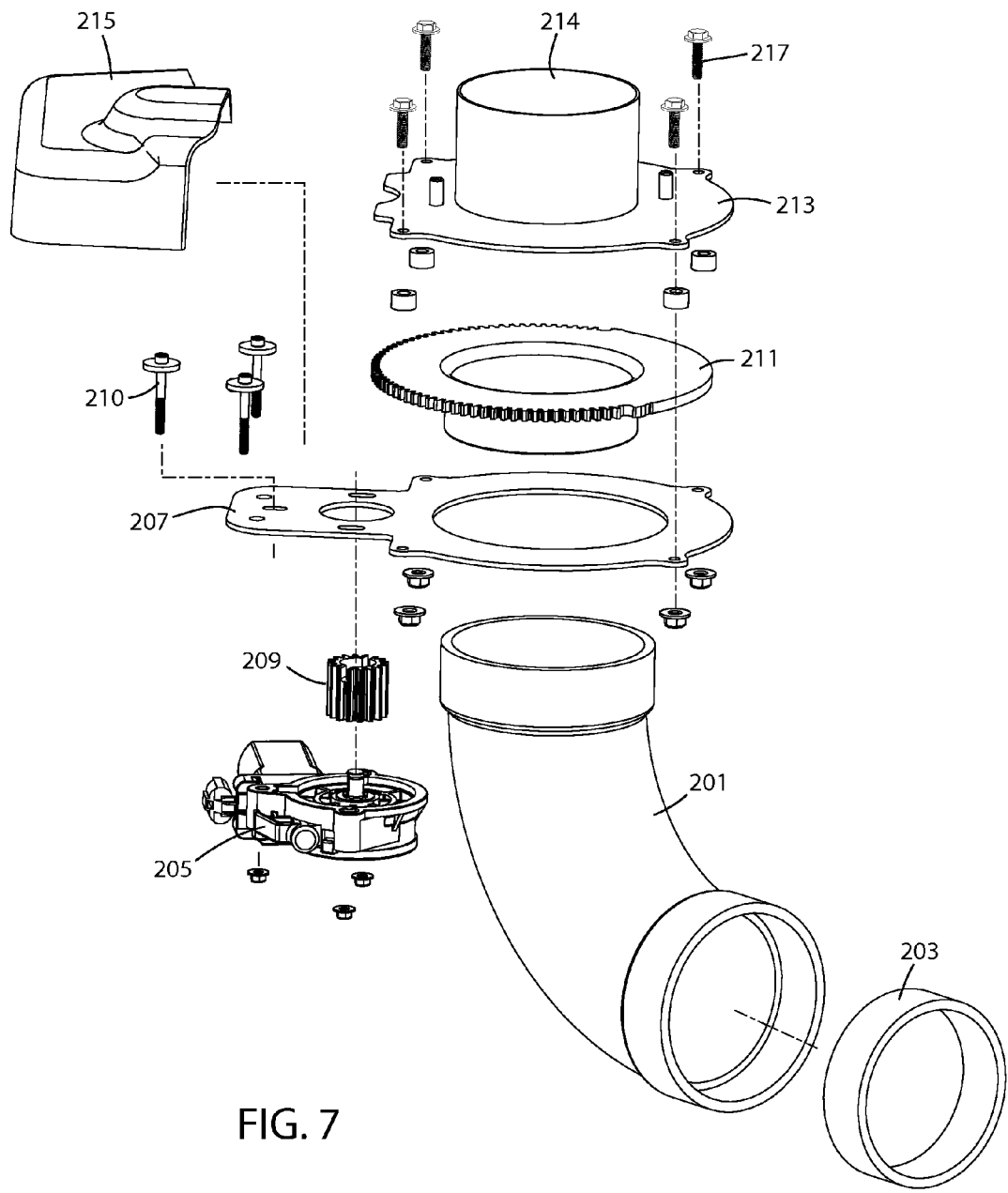
FIG. 7 is an exploded view illustrating the components of a second embodiment of the moveable nozzle assembly.
Figure 8:
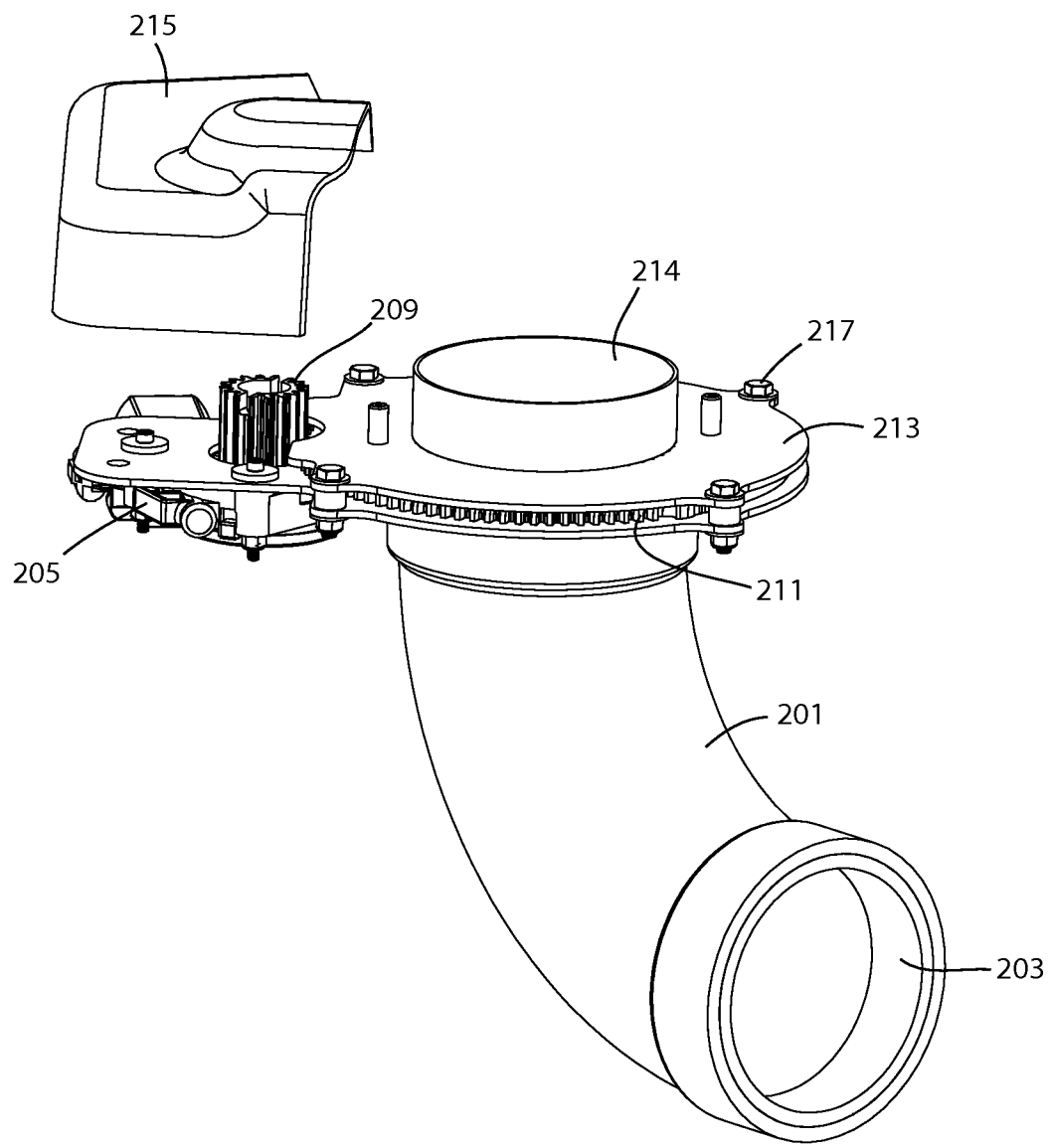
FIG. 8 is an exploded view illustrating the components of a second embodiment of the moveable nozzle.

FIG. 7 is an exploded view illustrating the components of a second embodiment of the moveable nozzle assembly. FIG. 8 is a side perspective view of the moveable nozzle assembly as shown in FIG. 7. With regard to both FIG. 7 and FIG. 8, the moveable nozzle assembly 200 includes a 90 degree elbow 201 and a rigid tip insert 203. As described herein, the 90 degree elbow 201 works to direct air from a blower motor though a 90 degree turn with minimal attenuation of the air velocity. The rigid tip insert 203 works to prevent the distal end of the elbow 201 from deforming during high velocity air flow. Moreover, it also prevents deformation of the 90 degree elbow 201 when if it comes into contact with the ground. As seen in FIG. 7, the rigid tip insert 203 fits within a enlarged area of the 90 degree elbow 201 which has a greater circular diameter at its distal end. Although shown as a elbow that is circular in cross-section, those skilled in the art will recognize that other nozzle shapes and configurations are also possible. In one alternative embodiment, a removable and replaceable nozzle can be inserted into the 90 degree elbow 201. Moreover, a user controllable baffle can be used inside the nozzle to control the air speed velocity from the blower motor. Further, nozzle extensions can be used to adjust overall nozzle position or length relative to the ground.

Further, the moveable nozzle assembly 200 includes a rotation motor 205. The rotation motor 205 is low voltage DC motor that is configured using a lower mount 207 such that the motor rotation motor 205 is mounted to the lower mount 207. The rotation motor 205 is configured so to operate with a pinion 209 the mounts to the shaft of the rotation motor 205. The pinion 209 mounts vertically, in relation to the lower mount 207, and is cylindrically shaped having teeth around its circumference. The pinion 209 engages with a gear 211 to rotate the gear 211 in an arc motion in either direction from a center position. The gear 211 is substantially flat in shape and includes a plurality of teeth around its perimeter. A stop is located at a predetermined position on each end of the stop to define a range of motion for the gear. For example, the range of motion may be a range from 0 to 235 degrees allowing the 90 degree elbow to rotate in this motion allowing high velocity air to be directed both in front and to the sides of the blower motor (not shown). Those skilled in the art will further recognize that the motor 205 can be actuated either manually by the operator or through an automated type control so the elbow 201 can move back and forth automatically. Further, covers an/or shrouds positioned over the blower motor can be made removable for operator cleaning and maintenance.

In order to mount and control the gear 211, an upper mount weldment 213 is used in combination with a tube 214. At one end, the tube 214 engages within a hole within the weldment 213 and is sized so that it outer diameter fits within the proximal end of elbow 201. At its opposite end, it engages with the blower housing (not shown). The upper mount weldment 213 is also used to hold the gear 211, lower mount 217 and elbow 201 together in compression so that the elbow 201 may move in a horizontal rotational motion relative to the ground. Finally, a cover 215 works to cover the pinion 209 and gear 211 preventing debris or other foreign objects from damaging these components. As best seen in FIG. 8, the upper mount weldment 213 will securely hold the lower mount 20, gear 211 and the upper mount weldment 213 together with one or more screws 217.

Thus, the present invention is directed to embodiments of a horizontally adjustable nozzle assembly for use with a landscape blower that includes an elbow and an electric motor. A gear assembly is operated by the electric motor where the gear assembly connects to the nozzle assembly for rotating the elbow within at least a 180 degree range but less than a full 360 degrees of rotation. The gear assembly includes a pinion gear turned by the electric motor such that the pinion gear engages with a flat gear for rotation elbow in a user controllable motion.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A landscaping blower nozzle assembly comprising:
   an inlet section for allowing air into the assembly from a blower motor;
   an elbow section;
   an rotation motor;
   a nozzle where a portion of which is insertable into the elbow section; and
   wherein the rotation motor moves the elbow section, in a user controllable motion, though at least 180 degrees but less than 360 degrees of rotational motion.

2. A nozzle assembly as in claim 1, wherein the nozzle includes a narrow shaped insert at its distal end.

3. A nozzle assembly as in claim 2, wherein the nozzle is removable.

4. A nozzle assembly as in claim 1, wherein the inlet section is substantially straight.

5. A nozzle assembly as in claim 1, wherein the nozzle is pliable for returning to a fixed shape when bent.

6. A nozzle assembly as in claim 1, further comprising a gear assembly having a first gear and second gear.

7. A nozzle assembly as in claim 6, wherein the first gear is a substantially flat gear and the second gear is a pinion gear.

8. A nozzle assembly as in claim 1, wherein the motor connects to a pinion gear that controls a flat gear for moving the elbow.

9. A nozzle assembly for use with a landscaping blower comprising:
   an inlet section for receiving high velocity air from a gas motor;
   an elbow connected to the inlet section;
   an electric motor;
   a gear assembly for connecting the electric motor and elbow; and
   wherein the gear assembly includes a first gear and second gear operating with the motor for moving the elbow though an arc of motion.

10. A nozzle as in claim 9, wherein the inlet section is substantially straight.

11. A nozzle as in claim 9, wherein the first gear and a second gear are engaged in juxtaposition such that the first gear moves the second gear.

12. A nozzle as in claim 11, wherein the first gear is a flat gear and the second gear is a pinion gear.

13. A nozzle as in claim 12, wherein the motor moves the pinion gear so that the flat gear controls movement of the elbow.

14. A nozzle as in claim 9, arc of motion is at least 200 degrees.

15. A horizontally adjustable nozzle assembly for use with a landscape blower comprising:
   a nozzle;
   an electric motor;
   a plurality of gears operated by the electric motor; and
   wherein at least one of the plurality of gears is connected to the nozzle assembly for rotating the nozzle assembly in an approximately 200 degree range.

16. A nozzle assembly as in claim 15, further comprising;
   an elbow connected to the nozzle for directing air from a blower motor to the nozzle.

17. A nozzle assembly as in claim 15, wherein the elbow is made of a pliable material for bending and returning to a predetermined shape.

18. A nozzle assembly as in claim 17, further comprising a tensioning cable attached to the elbow for holding the elbow into a fixed position relative to the landscape blower.

19. A nozzle assembly as in claim 15, wherein the plurality of gears includes a flat gear having plurality of teeth for moving the nozzle and a pinion gear attached to the electric motor for engaging with the first gear.

20. A nozzle assembly as in claim 15, wherein the nozzle includes a rigid insert positioned within a distal end of the nozzle for maintaining the shape of the nozzle in a fixed position.

* * * * *